Patented Mar. 31, 1953

2,633,407

UNITED STATES PATENT OFFICE 2,633,407

PROCESS FOR PRODUCING RED UNHYDRATED IRON OXIDE

Daniel W. Marsh, Oakland, Calif., assignor to Mineral Pigments Corporation, Muirkirk, Md., a corporation of Maryland No Drawing. Application August 25, 1947,
Serial No. 770,543

17 Claims. (Cl. 23—200)

This invention relates to the manufacture of red iron oxide products. More particularly, it is concerned with the production of red iron oxide pigments, without a calcination step, by the oxidation of metallic iron, while immersed in a solution containing precipitated iron hydrate.

GENERAL ASPECTS

Red iron oxide pigments are commercially produced (1) by the calcination of copperas, (2) by the calcination of hydrates of iron which have been prepared by chemical precipitation from ferrous or ferric iron containing solutions, or (3) by mixing iron salts with alkaline materials in the dry state followed by calcination of the mixtures. Numerous attempts have been made to produce red iron oxide pigments without a calcination step utilizing the wet process type of operation which has been successfully employed for the production of yellow or brown oxide pigments of the hydrate type. For example, various shades of yellow pigments of hydrated iron oxides had been prepared commercially by precipitation from aqueous solutions using procedures such as those described in United States Patents Nos. 1,368,748; 1,923,362; 2,127,907 and 2,357,096. However, such types of operations have not been successfully employed heretofore for the production of red iron oxide pigments.

Probably the closest approach to the problem of producing red oxide pigments by a "wet process" is represented by the prior art procedures in which red pigments are prepared by oxidizing alkaline solutions of ferrous hydroxide at very high temperatures, but the pigments which result from such processes have poor color and other poor characteristics in addition to their very high cost.

OBJECTS

A principal object of this invention is the provision of a new process from the manufacture of red iron oxide products. Further objects include:

(1) The provision of a process for the production of red iron oxide pigments which does not use a calcination step, (2) The provision of a process for producing red iron oxide pigments from iron by oxidation of the iron while immersed in a solution containing a precipitated iron hydrate, (3) The provision of a method for producing red oxide pigments in which the shade of the pigment can be very easily controlled so that the desired shade of pigment does not have to be obtained by mixing batches of different shades, as is common in operations employing calcination steps, (4) The provision of new red iron oxide pigments having unusual brilliancy, low oil absorption, relatively very low manganese and copper content, and freedom from grits which possess very high purity of color, great tinctorial strength, and great purity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by (a) the special preparation of an aqueous mixture containing dissolved ferrous compounds and precipitated iron hydrates followed by (b) the oxidation of metallic iron while immersed in this specially prepared mixture. The special immersion mixture is prepared by (1) the precipitation of ferrous hydrate through the addition of an alkaline reagent to an aqueous solution of a ferrous compound followed by (2) the rapid reaction of a dissolved ferric compound with the resulting suspension of precipitated ferrous hydrate, and (3) the oxidation of the resulting mixture until it has been sufficiently oxidized to create a pH of 3 or below in the mixture. Metallic iron and oxidizing agent are then added to the mixture and this is continued until an aqueous suspension of the desired shade of red iron oxide pigment has been produced. Oxidation is then discontinued and the pigment recovered from the mixture by separation from the suspension liquor.

The success of the present invention, to a large extent, is due to the discovery that, in order to produce a red iron oxide pigment by means of a wet process, it is necessary to create a particular type of suspension of precipitated iron hydrate in an aqueous medium in which metallic iron may be oxidized to form red oxide pigments in conjunction with the specially prepared precipitated iron hydrate and to the discovery of the steps necessary for the preparation of this suspension. The exact chemical nature of the compounds and theoretical chemical reactions involved in this unique discovery are not fully known; but the preparation of red iron oxide pigments by a wet process without the use of a calcination step has been made possible by this discovery. Rapid oxidation of a precipitated ferrous hydrate by means of a ferric compound appears to be a key to the success in this matter.

SPECIFIC EMBODIMENTS

A more complete understanding of the procedures and conditions involved in producing these results may be had by reference to the following illustrative examples in which all parts are by weight.

*Example I*

While heat is applied to 270 parts of a 0.54 molar commercial, steel mill ferrous sulfate solution (equivalent to 30 gm./l. of ferrous iron and a sp. gr. of 1.075), and the solution is thoroughly agitated, 60 parts of a caustic soda solution containing 200 gm./l. of NaOH (sp. gr. 1.187) are added to the solution. This addition of alkali results in the immediate precipitation of a greenish-blue colloidal ferrous hydrate suspended in an aqueous medium and the formation of a viscous colloidal suspension having a pH of 11. As heating and agitation of the suspension continue, the color gradually darkens while the viscosity slowly decreases.

When the temperature of the suspension has reached 130° F., 72 parts of a 0.65 molar clear ferric sulfate solution (equivalent to 73 gm./l. of ferric iron and a sp. gr. of 1.200) are added to the suspension. This addition of ferric salt causes the colloidal suspension to immediately turn yellowish-brown in color, attain a pH of 3.9, and to appreciably decrease in viscosity.

Air is now blown into the solution so as to be uniformly dispersed throughout its volume while the solution is maintained at 130° F. The aeration of the solution is continued at this temperature until the pH of the mixture has dropped below 3 (blue with Congo red). This takes about 1 to 4 hours, depending upon the degree of aeration. During this time, the color of the solution progresses from a yellow-brown to a reddish-brown.

Increased heat is then applied in order to raise the temperature of the mixture to 180° F. and scrap iron is introduced into the solution. At this point, the ratio of dissolved ferrous iron to dissolved ferric iron is about 15 to 1 and the ratio of total ferrous iron to total ferric iron in the entire mixture is about 0.5 to 1.

Vigorous aeration of the solution and further additions of scrap iron are made until a light red pigment suspended in the aqueous medium has been formed, i. e., about 92 hours.

When the light red pigment is obtained, aeration is discontinued and any scrap iron remaining in the mixture is removed. The resulting pigment is then separated from the suspension liquor by filtration and is dried. Seventeen parts of brilliant, light-red iron oxide pigment containing less than 0.001% Mn content and less than 0.02% Cu content is obtained. The product is found to possess very great tinctorial power and color strength, but very low oil-absorption characteristics.

The following table presents the data on the analysis of reaction mixture at various important stages of the reaction.

| Time in hours | pH | Filtrate | | Total Mixture | | Remarks |
|---|---|---|---|---|---|---|
| | | Ferrous | Ferric | All Iron | Ferric | |
| 0 | 7.5 | | nil | 24.5 | nil | Addition of NaOH. |
| ¼ | 5.0 | 19.0 | 0.14 | 34.7 | 16.2 | Addition of Fe₂(SO₄)₃. |
| 4 | 2.7 | 19.5 | 0.03 | 37.3 | 18.1 | Just prior to iron addition. |
| 96 | 3.4 | 14.8 | 0.17 | 45.0 | 29.9 | End of run. |

The iron content figures are expressed in gms./liter in the above table. A slight discrepancy in the figures for each time will be noted, but this is within experimental error.

*Example II*

The process of Example I is carried out, but the aeration at 180° F. and the addition of scrap iron to the mixture is continued until a violet colored iron oxide pigment is obtained. After separation from the suspension liquor and drying, 120 parts of pigment are obtained which, aside from the difference in color, possess substantial identical properties to the light red pigment obtained by the process of Example I.

MODIFICATIONS AND EQUIVALENTS

While the above examples illustrate the preferred conditions and sequence of steps for the present process, it will be appreciated that changes in these specific conditions may be made and the unique results made possible by this invention can still be obtained. Thus, the preferred temperature for aeration prior to the addition of metallic iron is 130° F., but higher and lower temperatures than this may be used. Pigments possessing the greatest brilliancy and lowest oil absorption have been found to be produced when temperatures between 115 and 145° F. are used in this step of the operation.

Similarly, while 180° F. is the preferred temperature for operation when metallic iron is being oxidized in the iron hydrate suspension, other temperatures may be used. However, the best pigment is produced when temperatures between 160 and 200° F. are employed during the step.

It is preferable to add the hydrate precipitating base before the ferrous compound solution has been heated since this prevents the oxidation of ferrous material to ferric material, which is undesirable, i. e., the precipitated ferrous hydrate oxidizes much less rapidly in contact with air than does a soluble ferrous salt.

The above examples illustrate the use of ferrous sulfate solutions of a sp. gr. of 1.075 and ferric sulfate solutions of sp. gr. 1.200. It has been found that red iron oxides can be successfully prepared by my process using solutions which vary widely in concentration from these preferred values, although the resulting pigments are not in all cases comparable in desirable qualities. Best pigments, considering color, oil absorption, and tinctorial power, are obtained where ferrous salt solutions of concentration between 70 to 95 gm./l. (0.46 and 0.63 molar) and ferric salt solutions of concentration of between 100 and 400 gm./l. (0.25 and 1.0 molar) are used.

As will be apparent from the discussion above, the rapid oxidation of a preformed ferrous hydrate suspension using a ferric compound solution as the oxidizing reagent is an essential step in the process of obtaining a red oxide pigment in accordance with this invention. While the quality of the resulting pigment is influenced to some extent by the ratio of ferrous iron present in the entire suspension to ferric iron added thereto in this step of the operation, successful results can be obtained with a considerable variation in this ratio from the optimum of 1.67 to 1. The most desirable pigments are produced when this ratio is within the range of 1 to 1 and 2 to 1. Thus, sufficient ferric material is reacted with the ferrous hydrate to give a ratio of ferrous to ferric iron in the final reacted mixture of between about 0.5 to 1 and 1.5 to 1, preferably about 1 to 1.

It is possible to produce red pigments without the addition of a ferric salt solution to the ferrous hydrate suspension, such as by the formation of a ferric salt solution in situ for reaction with the ferrous hydrate, e. g., by the rapid formation of a ferric salt by oxidation of a dissolved ferrous salt by a strong oxidizing agent, such as perchloric acid. Superior products are produced, however, where a separate ferric compound solution is employed, as shown in the examples above.

The particular basic material which is used for the precipitation of the ferrous hydrate colloid does not appear to influence the process nor does the concentration of the solution of base used for this purpose appear to have any appreciable effect. Thus, while the best pigment is found to be produced when sodium hydroxide is used as the precipitating agent, other basic reagents may be employed for this purpose, e. g., calcium hydroxide, potassium hydroxide, sodium phosphate, sodium carbonate and the like. Sufficient of the alkaline material is used to cause precipitation of all of the ferrous iron, although, comparable results are obtained even if variations above or below this required amount are used.

The examples above illustrate the use of ferrous and ferric sulfate solutions as principal reagents in the process. However, it has been found that equally good results can be obtained by the use of other ferric or ferrous salts of strong mineral acids, such as ferric nitrate, ferrous nitrate, ferric bromide, ferrous bromide, ferric chloride and ferrous chloride or other ferric or ferrous compounds, particularly water soluble materials, e. g., ferric and ferrous acetate.

The preferred oxidizing agent for use in the invention is air, since this permits greatest degree of control as to extent of oxidation, in addition to being the most economical and eliminating need for internal agitators, since the introduced air itself acts to agitate the mixture. However, the process has been successfully operated using other oxidizing agents, such as other gases containing free oxygen, e. g., oxygen enriched air, super-heated steam and air or oxygen mixtures, and the like; solid or liquid oxidizing agents, such as hydrogen peroxide, sodium peroxide, perchloric acid, or similar reagents. If these latter strong oxidizing agents are used, however, they should be employed in such fashion as to maintain appreciable quantities of dissolved ferrous compound in the reaction mixture by chemical reaction of the immersed metallic iron.

The rate of oxidation is primarily controlled by the rate of addition of oxidizing agent to the reaction mixture. In the case of air, this rate is controlled largely by the rate of dispersion of gas in the mixture which, in turn, is dependent upon the shape and style of apparatus used. Since any type of apparatus may be used, the process times may be greatly varied. Generally, at least ½ to 4 hours are required between the admixture of the ferric salt with the ferrous hydrate before the addition of iron and between 48 and 160 hours are required from then on. However, wider variations in reaction times than these will produce satisfactory pigments.

Metallic iron is preferably not added to the reaction mixture until after the ferrous-ferric mixture has been oxidized to some extent. The desirable time for this addition is after the mass has been aerated sufficiently long to cause the formation of free acid, as tested for by Congo red indicator, i. e., a pH of 3 or below. It need not be added precisely at this time, but may be added considerably after this point with successful results.

The quality of metallic iron which is used in the operation is not critical and it has been found most economical to use scrap iron for this purpose. As a matter of fact, one of the important advantages of the process is that it permits iron containing rather large percentages of copper and manganese to be converted into a pigment that is very low in these elements, which are detrimental to red iron oxide pigments. This appears to be due to the fact that, as the process proceeds, these undesirable impurities in the scrap iron are concentrated in the suspension liquors and do not chemically combine with the resulting iron oxide compounds.

While the term "red iron oxide' has been used throughout the above discussion, it will be realized that it is employed in a generic sense. Thus, it is posible, by means of this invention, to produce pigments ranging in color from a bright orange-red to a deep violet depending primarily upon the extent to which the final oxidation step is carried. As a matter of fact, this constitutes one of the principal advantages of the invention, since the particular shade of pigment can be absolutely controlled by merely stopping the oxidation when the desired shade has been obtained and it is not necessary to resort to blending of various shades of pigment as is the case with processes using calcination steps. Since metallic iron is continually converted into the oxide pigment as the oxidation proceeds, greater yields of darker shade pigment are obtained than with lighter shades of pigment. In any event, the process provides an economical and commercially feasible method for the production of red iron oxide pigments from scrap iron and by-product iron solutions without recourse to complicated apparatus or expensive operations, such as calcination or the like.

The products produced by this invention are characterized by low impurity content, i. e., Mn contents of the order of 0.001% and Cu content of the order of 0.02%, with substantially all of the product being pure iron oxide. These characteristics differentiate the pigments of this invention from other commercially produced red iron oxide pigments which have manganese and copper contents about 100 times greater and from the yellow or brown iron oxide pigments, such as those produced by wet processes, which are hydrated with one or more molecules of water.

I claim:

1. The process of producing red unhydrated iron oxide pigment which comprises forming an aqueous suspension of precipitated ferrous hydrate by precipitation from a solution of a ferrous compound with a base, adding an aqueous solution of a ferric salt to the resulting suspension, causing the suspension to have a pH in the acidic range, adding metallic iron to said suspension, oxidizing the metallic iron while immersed in said suspension, and continuing said oxidation until the desired shade of pigment is obtained.

2. The process of producing red unhydrated iron oxide pigment which comprises forming an aqueous suspension of precipitated ferrous hydrate by adding a base to an aqueous solution of a ferrous salt, adding an aqueous solution of ferric salt to the resulting suspension, blowing air into the suspension until it has a pH in the acidic range, adding metallic iron to said acidic suspension, oxidizing the metallic iron while immersed in said suspension by continued air-blowing of the suspension, adding further metallic iron as the previous portions thereof become oxidized and continuing said air-blowing and iron addition until the desired shade of pigment is obtained.

3. In a process for the production of red unhydrated iron oxide pigment by oxidation of iron immersed in a solution containing a precipitated iron hydrate, the steps which comprise adding an aqueous solution of a ferric salt to an aqueous suspension of a precipitated ferrous hydrate and thereafter oxidizing metallic iron immersed in the resulting suspension with the suspension at a pH in the acidic range.

4. A process for the production of red unhydrated iron oxide pigment which comprises forming a suspension of precipitated ferrous hydrate, adding a ferric salt to the suspension thereby forming a precipitated iron hydrate immersion mixture causing said mixture to have a pH in the acidic range, immersing metallic iron in the resulting acidic mixture, and oxidizing the iron while immersed in said mixture.

5. The process of claim 4 in which the ratio of ferrous iron in the suspension to added ferric iron is between about 1 to 1 and 2 to 1.

6. In the process of producing a red unhydrated iron oxide pigment by oxidation of metallic iron immersed in a solution containing a precipitated iron hydrate, the steps which comprise adding an aqueous solution of a ferric salt to an aqueous suspension of a precipitated ferrous hydrate, oxidizing the resulting mixture sufficiently to cause the pH thereof to drop below 3, and then adding metallic iron to the mixture.

7. The process of producing a red unhydrated iron oxide pigment which comprises adding a base to a solution of a ferrous salt to cause the precipitation of the iron as ferrous hydrate, heating the suspension to between about 115° and 145° F., adding an aqueous solution of a ferric salt to the heated suspension, introducing an oxidizing agent into the resulting suspension, continuing the introduction of the oxidizing agent so as to cause progressive oxidation of the iron compounds in the suspension and cause the pH to go below 3, raising the temperature of the suspension to between about 160 and 200° F. subsequent to the addition of the ferric compound, adding metallic iron to the suspension, continuing the addition of metallic iron and oxidizing agent to the heated suspension until the desired shade of pigment is obtained, then discontinuing the introduction of the oxidizing agent and separating the pigment from the suspension liquor.

8. The process of claim 7 in which said base is sodium hydroxide.

9. The process of claim 8 in which the ferrous salt is the ferrous salt of a mineral acid.

10. The process of claim 9 in which the ferric salt is a ferric salt of a mineral acid.

11. The process of claim 10 in which the ferrous salt solution has a concentration of between about 70 to 95 grams per liter and the ferric salt solution has a concentration of between about 100 and 400 grams per liter.

12. The process of claim 11 in which the ratio of ferrous iron in the suspension of precipitated hdyrate to ferric iron in the added ferric salt solution is between about 1 to 1 and 2 to 1.

13. The process of claim 12 in which the oxidizing agent is a free-oxygen containing gas.

14. The process of claim 13 in which the iron is scrap iron low in manganese and copper content.

15. The process of claim 14 in which the oxidizing agent is air, the ferrous salt is ferrous sulfate, and the ferric salt is ferric sulfate.

16. The process of claim 15 in which the total time for introduction of air to the suspension is between about 48 and 160 hours.

17. The process of producing a red unhydrated iron oxide pigment which comprises adding sufficient alkaline agent to a ferrous salt solution of a concentration between about 0.45 to 0.65 molar to cause precipitation of substantially all of the iron as ferrous hydrate, heating the suspension to between 115 to 145° F., adding a ferric salt solution of concentration between 0.25 and 1.0 molar to the heated suspension in amount so that the ratio of ferrous iron in the ferrous hydrate suspension to ferric iron in the ferric salt solution is between 1 to 1 and 2 to 1, passing air into the resulting mixture, continuing aeration of the mixture to cause progressive oxidation of the iron compounds in the mixture and cause the pH to go below 3, adding iron to the aerated mixture, heating the resulting mixture to between 160 and 200° F., continuing the iron addition and aeration until a suspension of pigment of desired shade is obtained, then discontinuing the aeration and separating the pigment from the suspension liquor.

DANIEL W. MARSH.

REFERENCES CITED

The following references are of record in the file of this patent:

UNITED STATES PATENTS

| Number | Name | Date |
|---|---|---|
| 1,368,748 | Penniman et al. | Feb. 15, 1921 |
| 1,424,635 | Fireman | Aug. 1, 1922 |
| 1,840,326 | Ott et al. | Jan. 12, 1932 |
| 2,127,907 | Fireman | Aug. 23, 1938 |
| 2,388,659 | Ryan | Nov. 6, 1945 |

FOREIGN PATENTS

| Number | Country | Date |
|---|---|---|
| 385,646 | Great Britain | Jan. 5, 1933 |